United States Patent
Reese

(10) Patent No.: US 6,618,474 B1
(45) Date of Patent: Sep. 9, 2003

(54) METHOD AND APPARATUS FOR PROVIDING TO A CUSTOMER A PROMOTIONAL MESSAGE BETWEEN RINGING SIGNALS OR AFTER A CALL WAITING TONE

(76) Inventor: Morris Reese, P.O. Box 6651, Thousand Oaks, CA (US) 91359

( * ) Notice: Subject to any disclaimer, the term of this patent is extended or adjusted under 35 U.S.C. 154(b) by 0 days.

(21) Appl. No.: 09/520,092

(22) Filed: Mar. 8, 2000

Related U.S. Application Data

(60) Provisional application No. 60/123,132, filed on Mar. 8, 1999.

(51) Int. Cl.[7] ................................................. H04M 1/56
(52) U.S. Cl. .............................. 379/142.17; 379/142.02; 379/215.01
(58) Field of Search ........................... 379/93.01, 93.17, 379/142.02, 142.08, 142.17, 215.01

(56) References Cited

U.S. PATENT DOCUMENTS

| | | |
|---|---|---|
| 3,570,008 A | 3/1971 | Downing et al. |
| 4,551,581 A | 11/1985 | Doughty |
| 4,567,323 A | 1/1986 | Lottes et al. |
| 4,582,956 A * | 4/1986 | Doughty ................ 379/142.17 |
| 4,899,358 A | 2/1990 | Blakley |
| 4,922,490 A | 5/1990 | Blakley |
| 4,924,496 A | 5/1990 | Figa et al. |
| 5,033,076 A | 7/1991 | Jones et al. |
| 5,263,084 A | 11/1993 | Chaput et al. |
| 5,289,530 A | 2/1994 | Reese |
| 5,309,512 A | 5/1994 | Blackmon et al. |
| 5,341,414 A | 8/1994 | Popke |
| 5,583,924 A | 12/1996 | Lewis |
| 5,613,006 A | 3/1997 | Reese |
| 5,619,561 A | 4/1997 | Reese |
| 5,680,447 A | 10/1997 | Diamond et al. |
| 5,764,748 A | 6/1998 | Rosenthal et al. |
| 5,784,448 A | 7/1998 | Yaker |
| 6,427,009 B1 * | 7/2002 | Reese .................... 379/215.01 |

* cited by examiner

Primary Examiner—Creighton Smith

(57) ABSTRACT

This invention relates to apparatus and method in conjunction with a service wherein a called caller identification (caller ID) customer is provided a promotional message such as "We Are Talking Chevrolet", rather than a conventional privacy message such as "anonymous caller", during a silent interval between intermittent ringing signals or after a call waiting (CW) tone when a calling party or a local switching office of the calling party has invoked a privacy option to prevent the delivery of the calling party's directory telephone number with or without a corresponding name (DN) to customer premises equipment (CPE) of the caller ID customer. In accordance with this invention, when the calling party's DN is received at a local switching office (LSO) of the caller ID customer flagged as "private" indicating that the DN may not be disclosed to the caller ID customer, the LSO sends the intermittent ringing signals or the CW tone to the caller ID customer. The LSO then accesses its associate data-base and selects the promotional message from a plurality of promotional messages stored in the database and transmits the promotional message selected from the database to the CPE of the caller ID customer during the silent interval. The CPE receives and displays to the caller ID customer the promotional message from the LSO during the silent interval and subsequently stores the received promotional message in an associate memory for later retrieval and display.

7 Claims, 4 Drawing Sheets

METHOD AND APPARATUS FOR PROVIDING TO A CUSTOMER A PROMOTIONAL MESSAGE BETWEEN RINGING SIGNALS OR AFTER A CALL WAITING TONE

"This application claims the benefit of U.S. Provisional Application No. 60/123,132 filed on Mar. 8, 1999".

FIELD OF THE INVENTION

This invention relates to a telephone switching system and particularly to providing to a customer a promotional message from the telephone switching system during a silent interval between ringing signals or after a subscriber alerting signal tone.

BACKGROUND OF THE INVENTION

Call Waiting (CW) and Caller Identification (CID) are well known concepts in the telephone and cellular industry. With CW, a telephone or cellular user who is speaking with a second party on the telephone receives a subscriber access signal (SAS) tone, which is similar to a conventional CW tone, from the telephone company central office of the user when the user has another incoming call from a third party. The SAS tone is audible in the user's telephone or cellular receiver. After hearing the SAS tone, the user has the choice of ignoring the incoming call or answering the incoming call by pressing a preselected button (or the hookswitch) of the telephone. If the user answers the incoming call, the second party is placed on "hold". Although the user is informed when the third party is calling, the user does not receive the CID information which typically includes the name and telephone number of the third party.

With CID, the telephone company transmits encoded information to the user's telephone (or the user's adjunct device connected to the telephone) between the first and second ring signals from the telephone company. This encoded information (CID information) includes the name and telephone number of the calling party. The user's customer premises equipment (CPE) connects to the user's telephone line and detects, decodes, displays and stores the encoded information. For the CPE to properly process the CID information, the telephonee must be in an on-hook condition when the CID information is received. As used herein, the term "on-hook" refers to the condition which generally exists when the handset of the telephone is resting on the hookswitch of the telephone and the term "off-hook" refers to the condition which generally exists when the handset of the telephone is removed from the hookswitch of the telephone.

The two concepts of CID and CW have also been combined to create CID with CW (CIDCW). CIDCW requires that the telephone or cellular user have a CPE (or the equivalent) connected to the telephone line. When the user is speaking on the phone with a second party and receives a call from a third party, a SAS tone followed by a CPE alerting signal (CAS) tone is transmitted from the telephone company central office of the user to the user's CPE. The CAS tone is similar to a dual tone multi-frequency (DTMF) signal, but has higher frequencies and is of a lower amplitude. The CPE detects the CAS tone and then transmits an acknowledge signal to the telephone company central office. The acknowledge signal has been defined to be the DTMF signal "D". During the transmission of the acknowledge signal, the CPE mutes its own handset for a predetermined interval of time and the telephone company central office mutes the acknowledge signal so that the second party does not hear the acknowledge signal. Upon detecting the acknowledge signal, the telephone company central office transmits the CID information of the third party to the user's CPE. The CPE receives and displays to the user the third party's CID information and communication is re-established with the second party.

In both CID and CIDCW systems, the calling party may be allowed to invoke a "privacy" option to prevent delivery of the calling party's CID information (i.e. name & telephone number) to the user's CPE. In this case, the originating telephone company central office of the calling party transmits the CID information relating to the calling party to the terminating telephone company central office of the user (as is done for calls where the privacy capability is not invoked) so that the calling party's CID information is available for other network services (i.e. automatic callback/automatic recall) that might use it. However, the calling party's CID information is marked "private" so the terminating central office recognizes that it should not be transmitted to the user's CPE. The terminating central office responds to the CID information marked as "private" from the originating central office by sending a "privacy indicator code" to the user's CPE. The CPE responds to the "privacy indicator code" by displaying to the user the term "private caller", "anonymous caller" or "unavailable" so the user can determine that the calling party has invoked the privacy capability.

It would therefore be desirable to have a system and method which would provide to the CID or CIDCW customer a promotional message (i.e. a company's name, product, slogan or website, etc.) instead of the conventional privacy message (i.e. private caller, anonymous caller or unavailable, etc.) when the calling party has invoked the privacy option to prevent the delivery of his/her CID information to the CID or CIDCW customer CPE.

SUMMARY OF THE INVENTION

Accordingly, a technical advance is achieved by method and apparatus for providing to a Caller Identification (hereinafter sometimes referred to as "CID") customer a promotional message during a silent interval between ringing signals from a local stored program-controlled switching office (hereinafter sometimes referred to as "LSO" or "Local Switching Office") when a calling party has invoked a privacy option to prevent the delivery of his/her directory telephone number with or without a corresponding name (hereinafter sometimes referred to as "CID information") to customer premises equipment (hereinafter sometimes referred to as "CPE") of the CID customer.

In the present invention, after CID information of the calling party is received to the LSO of the CID customer marked as "private" from an originating stored program-controlled switching office (hereinafter sometimes referred to as "OSO" or "originating switching office") of the calling party indicating that the CID information should not be transmitted to the CPE of the CID customer, the LSO sends intermittent ringing signals to the CID customer. Alternately, and depending on the LSO, the LSO may want to send a privacy indicator code following a first ringing signal so that conventional CID display devices can still be used along with the CPE of the present invention without either affecting the other. In continuance of the present invention, following a first one of the ringing signals to the CID customer, the LSO selects, sequentially, by any known technique a promotional message from a variety of promotional messages stored in an associate data base (or memory) and transmits the selected promotional message from the associate data base (or memory) to the CPE of the CID customer during a silent interval between the ringing signals, preferably between the first and second ringing signals. This stored program-controlled switching system (SPCS) to CPE transmission does not require any special customer loop; it occurs over the tip and ring leads of the CID customer loop. The CPE of the CID customer receives and displays to the CID customer the promotional message from the LSO during the silent interval between the ringing signals. The promotional message is thus displayed during the silent interval and remains displayed after the silent interval. The displayed message can state, for example, "Watch NBC Sports" or "Have a Pepsi Today" or "Shop Ralphs" or "Kentucky Does Chicken Right" or "Got Milk" or "NFL on Fox TV", etc. The CPE of the CID customer subsequently stores the received promotional message in an associate memory for later recall from the associate memory and display to the CID customer.

Another technical advance is achieved by method and apparatus for providing to a Caller Identification with Call Waiting (hereinafter sometimes referred to as "CIDCW") customer already engaged in a telephone conversation with a far-end caller via a LSO a promotional message during a silent interval after a subscriber alerting signal (hereinafter sometimes referred to as "SAS" or "CAS" tone from the LSO when a call waiting caller has invoked a privacy option to prevent the delivery of his/her CID information to a CPE of the CIDCW customer.

In the present invention, after CID information of the call waiting caller is received to the LSO of the CIDCW customer marked as "private" from an OSO of the call waiting caller indicating that the CID information should not be transmitted to the CPE of the CIDCW customer, the LSO sends the SAS or CAS tone, similar to a conventional call waiting tone, to the CIDCW customer. The CPE of the CIDCW customer, upon detecting the tone from the LSO, mutes its own handset for a predetermined duration of time corresponding to at least the duration of the promotional message to be transmitted between the LSO and the CPE of the CIDCW customer. It will be realized that the time period discussed is arbitrary and may be predetermined to any value consistent with proper operation. After the LSO sends the tone to the CID customer, the LSO selects, sequentially, by any known technique a promotional message from a variety of promotional messages stored in an associate data base (or memory) and transmits the selected promotional message from the associate data base (or memory) to the CID of the CIDCW customer during the silent interval after the tone. The tone appearing on the CIDCW customer loop is a dual-tone signal and the promotional message is transmitted between the LSO and the CPE of the CIDCW customer using frequency shift keyed (hereinafter sometimes referred to as "FSK") signaling. The CPE of the CIDCW customer receives and displays to the CIDCW customer the promotional message from the LSO during the silent interval after the tone. The promotional message is thus displayed during the silent interval and remains displayed after the silent interval and subsequently stored in an associate memory for later recall and display. The displayed promotional message can state, e.g. one of the examples above.

It is to be understood that the LSO may require that the CPE of the CIDCW customer, in addition to muting its own handset in response to the tone from the LSO, transmit an acknowledge signal to the LSO which, in turn, sequentially selects the promotional message from the associate data base (or memory) and transmits the selected promotional message from the associate data base (or memory) to the CPE of the CIDCW customer during the silent interval after the tone.

The present invention will be more fully understood in view of the following description and drawings.

DESCRIPTION OF THE PREFERRED EMBODIMENT(S)

Figure 1:
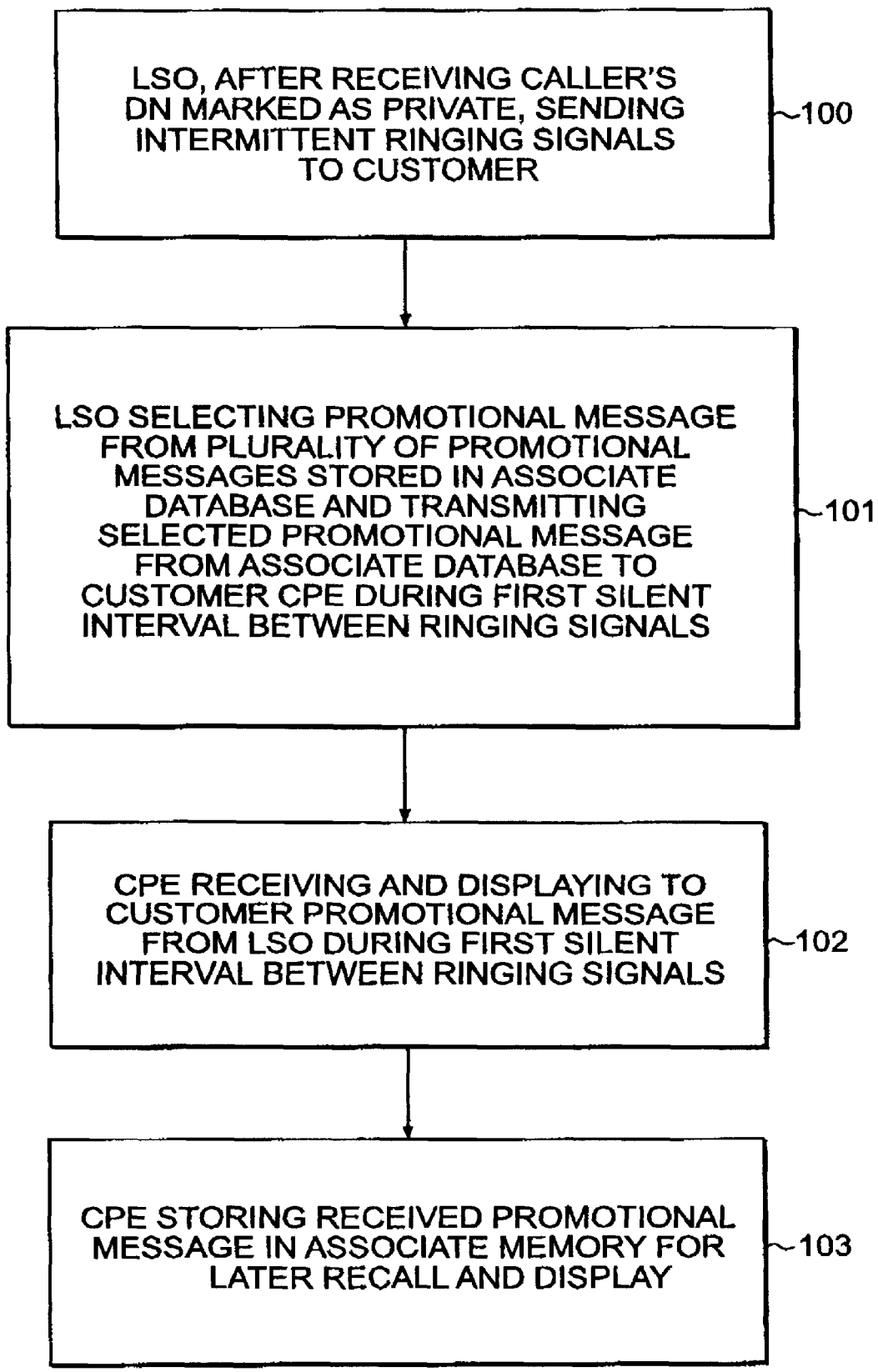
FIG. 1 shows, in flow chart form, the sequence of operations in accordance with one embodiment of the invention.

Referring now to FIG. 1, (step 100) the process begins after CID information relating to a calling party is received at a LSO (FIG. 4) of a CID customer marked as "private" from an OSO (FIG. 4) of the calling party indicating that the CID information should not be transmitted to a CPE (FIG. 3) of the CID customer. Central control (block 409 of FIG. 4), under the control of a central processor (block 408 of FIG. 4) of the LSO, recognizes the "private" marked CID information and sends intermittent ringing signals to the CID customer.

At step 101, central control then selects, sequentially, by any known technique a promotional message from a variety of promotional messages stored in an associate data base (block 418 of FIG. 4) or memory (block 410 of FIG. 4) of the LSO and signals a data transmitter (block 450 of FIG. 4) of the LSO which, in turn, transmits data representative of the selected promotional message from the associate data base (or memory) to the CPE of the CID customer during a silent interval between the ringing signals, preferably between the first and second ringing signals. A FSK signal represents this data and this stored program-controlled switching system (SPCS) to CPE transmission does not require any special customer loop and can provide date and time of the promotional message; it occurs over the tip and ring leads (FIG. 3) of the CID customer loop.

At step 102, a line interface (block 11 of FIG. 3) of the CPE of the CID customer receives from the data transmitter of the LSO a FSK signal comprising two carrier frequencies which represent the low and the high of the data representative of the promotional message in a balance manner on the tip and ring leads of the CPE during the silent interval between the first and second ringing signals and passes the FSK signal to a FSK demodulator (block 26 of FIG. 3) of the CPE. The FSK demodulator converts the FSK signal received from the line interface to a serial bit stream representative of the data and signals an universal asynchronous receiver transmitter (UART) of a microprocessor (block 20 of FIG. 3) of the CPE to receive the data. In addition, the FSK demodulator generates a carrier detect control signal indicating the presence of the FSK signal. The UART (not shown) converts the data received to a parallel format that is fed to the microprocessor. The microprocessor (1) interprets and stores the data received in a receive buffer register (not shown) of the UART, (2) converts the stored data into a format suitable for display in a display unit (block 23 of FIG. 3) of the CPE and (3) periodically update the characters (block 24 of FIG. 3) of the display by any known technique or as described in Doughty's U.S. Pat. No. 4,582, 956. This data represents the promotional message. These actions are accomplished by program instructions stored in a program memory (not shown) of the microprocessor which direct the microprocessor to perform its many functions.

At step 103, the microprocessor uses a program stored in the program memory of the CPE, which is similar to the storing program described in U.S. Pat. No. 4,924,496 (Figa et al.), to store the received promotional message in a memory unit (block 29 of FIG. 3) of the CPE for later recall from the memory unit and display in the display unit.

Figure 2:
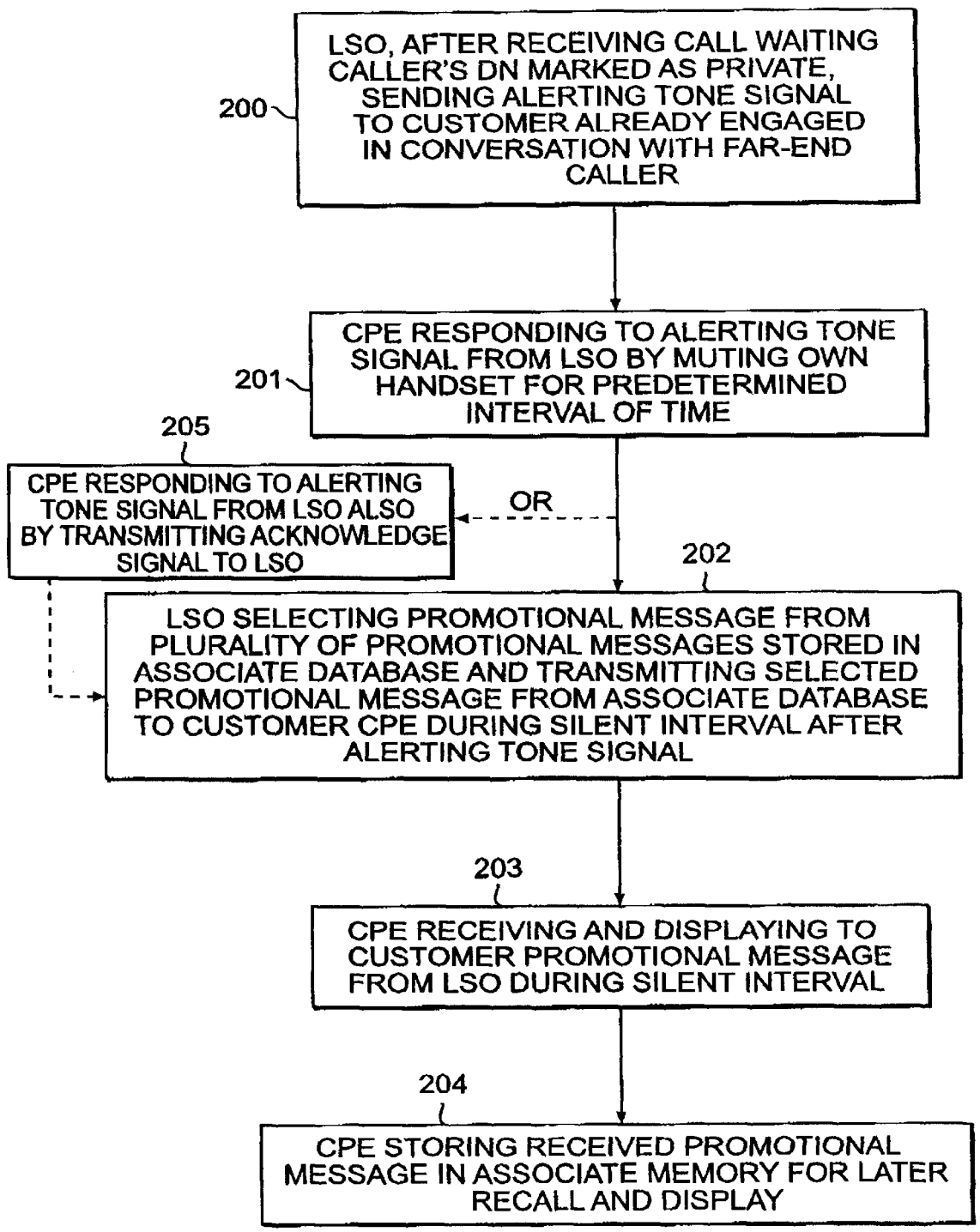
FIG. 2 shows, in flow chart form, the sequence of operations in accordance with another embodiment of the invention.
Figure 3:
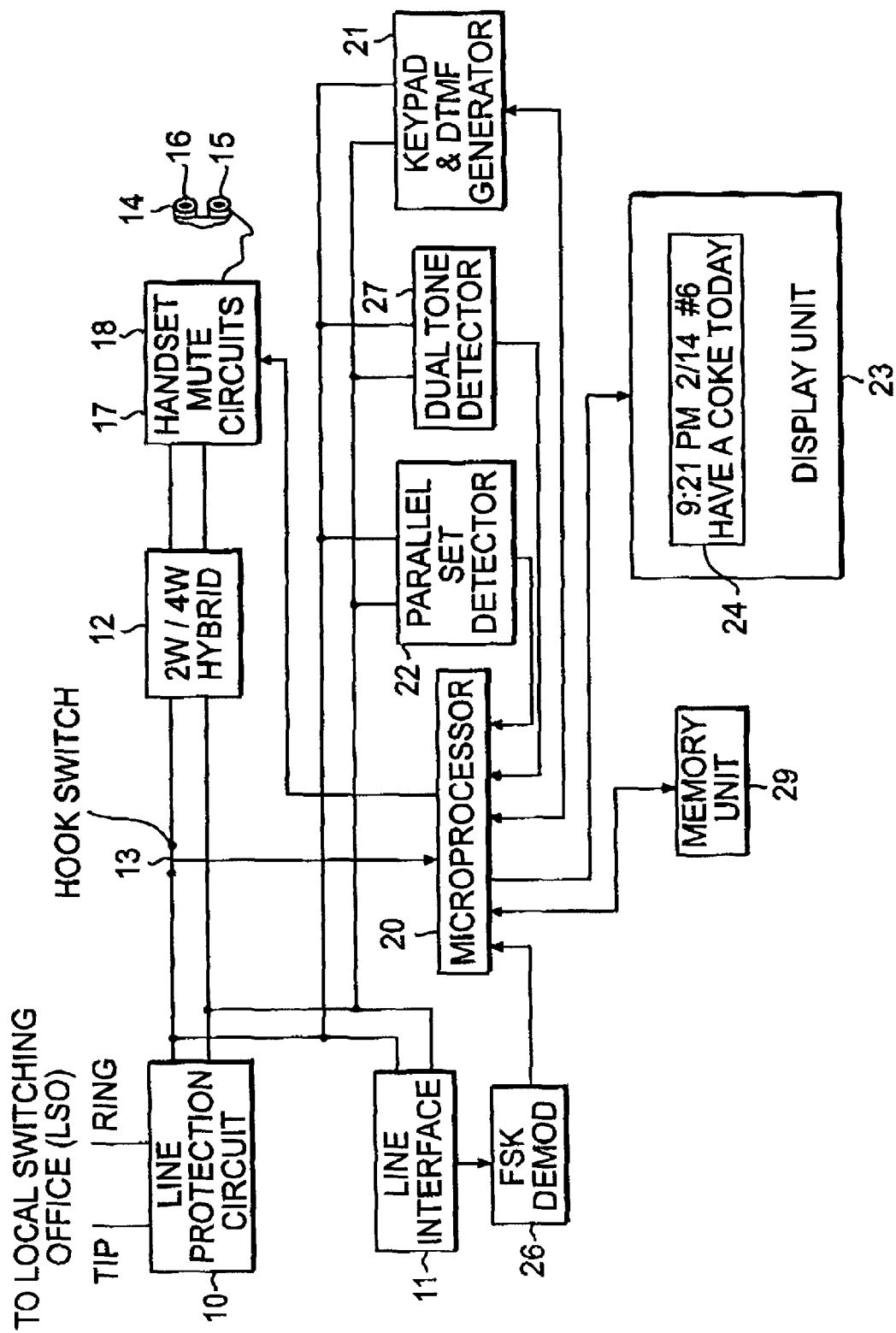
FIG. 3 is a block diagram schematic diagram of a CPE which is connected via telephone lines to the LSO shown in FIG. 4, and which can be used along with conventional CID and CIDCW display devices.
Figure 4:
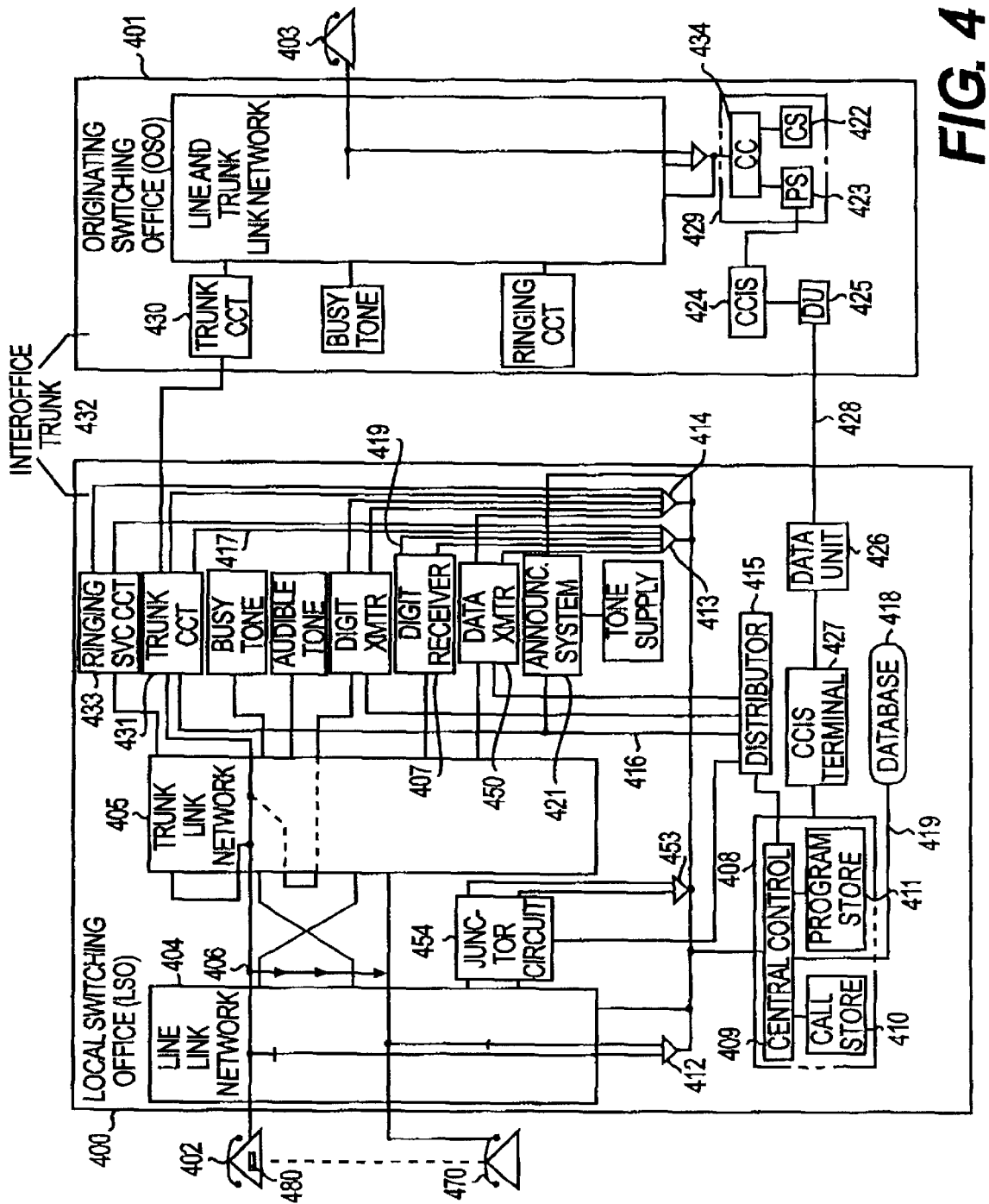
FIG. 4 shows, in block diagram form, a telephone system having a LSO and an OSO interconnected by trunks and a common channel inter-office signaling system.

Referring now to FIG. 2 in conjunction with FIG. 3 and FIG. 4, (step 200) it will be assumed that a CIDCW customer associated with the CPE of FIG. 3 is conversing with a far-end caller via the LSO of FIG. 4 and that a call waiting caller is attempting to reach the CIDCW customer. The process begins after CID information which includes a directory telephone number with or without an accompanying name relating to the call waiting caller is received at the LSO of the CIDCW customer marked as "private" from the OSO (of FIG. 4) of the call waiting caller indicating that the CID information should not be transmitted to the CPE of the CIDCW customer. Central control (block 409 of FIG. 4), under the control of a central processor (block 408 of FIG. 4), recognizes the "private" marked CID information and enters a call processing software program associated with a call waiting feature and it causes a predetermined dual-tone signal, i.e. a SAS tone or the SAS tone followed by a CPE alerting signal (CAS) tone, to be transmitted on the CIDCW customer loop.

At step 201, a dual-tone detector of the CPE (block 27 of FIG. 3) detects the presence of the dual-tone signal from the LSO of FIG. 4 and signals a microprocessor of the CPE (block 20 of FIG. 3) which reacts by muting a handset 14 of the CPE (of FIG. 3) via switches 17 and 18 of the CPE (of FIG. 3) for a predetermined interval of time corresponding to at least the duration of the promotional message to be transmitted between the LSO of FIG. 4 and the CPE of FIG. 3. It will be realized that the time period discussed is arbitrary and may be predetermined to any value consistent with proper operation. A dual-tone detector suitable to detect reliably the presence of the dual-tone signal in the presence of voice signals is described in U.S. patent application Ser. No. 07/676,593 to Chaput et al., and in U.S. Pat. No. 5,263,084 to Chaput et al., herein incorporated by reference in their entirety.

At step 202, central control of the LSO (block 409 of FIG. 4) selects, sequentially, by any known technique a promotional message from a variety of promotional messages stored in an associate data base of the LSO (block 418 of FIG. 4) or memory of the LSO (block 410 of FIG. 4) and signals a data transmitter of the LSO (block 450 of FIG. 4) which, in turn, transmits data representative of the selected promotional message from the associate data base or memory to the CPE of FIG. 3 (of the CIDCW customer) during a silent interval after the tone from the LSO of FIG. 4. A FSK signal represents this data. This LSO to CPE transmission does not require any special customer loop and can provide date and time of the promotional message; it occurs over the tip and ring leads of the CIDCW customer loop.

At step 203, a line interface of the CPE (block 11 of FIG. 3) receives from the data transmitterr of the LSO (block 450 of FIG. 4) the FSK signal comprising two carrier frequencies which represent the low and the high of the data representative of the promotional message in a balance manner on the tip and ring leads of the CPE shown in FIG. 3 during the silent interval after the tone from the LSO of FIG. 4 and passes the FSK signal to a FSK demodulator of the CPE (block 26 of FIG. 3). The FSK demodulator converts the FSK signal received from the line interface to a serial bit stream representative of the data and signals an universal asynchronous receiver transmitter (UART) of a microprocessor of the CPE (block 20 of FIG. 3) to receive the data. The FSK demodulator also generates a carrier detect control signal indicating the presence of the FSK signal. The UART (not shown) converts the data received to a parallel format that is fed to the microprocessor. The microprocessor (1) interprets and stores the data received in a receive buffer register (not shown) of the UART, (2) converts the stored data into a format suitable for display in a display unit of the CPE (block 23 of FIG. 3) and (3) periodically update the characters of the display (block 24 of FIG. 3) by any known technique or as described in Doughty's U.S. Pat. No. 4,582, 956. This data represents the promotional message. The promotional message is thus displayed during the silent interval and remains displayed after the silent interval. These actions are accomplished by program instructions stored in a program memory (not shown) of the microprocessor which direct the microprocessor to perform its many functions.

At step 204, the microprocessor of the CPE (block 20 of FIG. 3) uses a program stored in its program memory (not shown), which is similar to the storing program described in U.S. Pat. No. 4,924,496 (Figa et al.), herein incorporated by reference in its entirety, to store the received promotional message in a memory unit of the CPE (block 29 of FIG. 3) for later recall from the memory unit and display in the display unit of the CPE (block 23 of FIG. 3).

Alternately, (step 201) the dual-tone detector 27 of FIG. 3 detects the presence of the tone from the LSO of FIG. 4 and signals the microprocessor 20 of FIG. 3 which reacts by (1) muting the handset 14 of FIG. 3 via switches 17 and 18 of FIG. 3 and (2) entering a control loop that entails determining whether the parallel set detector 22 of FIG. 3 has detected an off-hook condition at any extension set and (3) signaling the DTMF generator 21 of FIG. 3 to (step 205) generate an acknowledge signal on the CIDCW customer loop to inform the LSO 400 of FIG. 4 that it is a CIDCW customer CPE capable of receiving data representative of the promotional message to be transmitted. The remaining processing steps 202, 203 and 204 are the same as previously described above. It is to be understood that proper operation may require that the dual-tone detector detect the presence of a CAS tone instead of the SAS tone from the LSO. In that case, the remaining processing steps 205, 202, 203 and 204 are the same as previously described above.

Referring now to FIG. 3, the tip and ring leads of the CID or CIDCW customer loop extend from the CPE shown in FIG. 3 to the LSO 400 shown in FIG. 4. As is conventional, the CPE shown in FIG. 3 comprises a line protection circuit 10 connected to a 2 wire/4 wire hybrid circuit 12 via a hookswitch 13. The hybrid circuit 12 is also connected to a handset 14 comprising transmit and transducers 15 and 16 via mute circuits 17 and 18. The CPE shown in FIG. 3 also comprises a line interface 11, a FSK demodulator 26, a microprocessor 20 comprising program and data memory and UART (not shown), a parallel set detector 22, a dual-tone detector 27, a keypad and DTMF (dual-tone multifrequency) generator 21, a memory unit 29, and a display unit 23 with LED or LCD display 24.

The line interface 11 receives a FSK signal comprising two carrier frequencies which represent the low and the high of data representative of a promotional message from the LSO and attenuates 20-hertz ringing signals. The FSK signal is received in a balance manner on the tip and ring leads of the CPE shown in FIG. 3 at an on-hook station of the CID customer during a silent interval between ringing signals, preferably between the first and second ringing signals, or at an off-hook station of the CIDCW customer during a silent interval after a SAS tone. A bandpass filter (not shown) of the line interface passes the two carrier frequencies of the FSK signal and greatly attenuates any other signals outside the frequency range of the two FSK signal frequencies.

The FSK demodulator 26 converts the FSK signal received from the line interface 11 to a serial bit stream representative of the data and signals the UART (not shown) of the microprocessor 20 to receive the data. In addition, the FSK demodulator generates a carrier detect control signal indicating when a FSK signal is present.

The UART (not shown) of the microprocessor 20 receives the data representative of the promotional message from the FSK demodulator 26 during the silent interval between the ringing signals, preferably between the first and second ringing signals, or during the silent interval after the SAS or CAS tone, and converts the received data to a parallel format that is fed to the microprocessor 20.

The parallel set detector circuit 22 functions to provide an output signal to the microprocessor 20 to indicate when an off-hook condition is detected on an extension telephone set (not shown) connected to the CPE shown in FIG. 3.

The program memory.(not shown) of the microprocessor 20 is a permanent memory such as an erasable programmable read only memory (EPROM) and stores program instructions which direct the microprocessor 20 to sequentially perform its many functions.

The data memory (not shown) of the microprocessor 20 is a temporary and erasable memory such as a random access memory (RAM) for storing information related to the incoming data representative, of the promotional message.

The dual-tone detector circuit 27 functions to detect the presence of the SAS or CAS tone from the LSO 400 shown in FIG. 4, and to provide an output signal to the microprocessor 20 upon the detection of the SAS or CAS tone.

The DTMF generator 21 functions to generate and transmit an acknowledge signal on the CIDCW customer loop to indicate to the LSO 400 of FIG. 4 that this is a CPE capable of receiving the promotional message to be transmitted, in response to signaling from the microprocessor 20 responsively to receiving the output signal from the dual-tone detector circuit 27.

The microprocessor 20 is the information processing unit and executes the program instructions stored in a program memory (not shown) of the microprocessor. Specifically, the microprocessor functions as the control hub-of the CPE by responding to signals from the circuits 26, 22 and 27 and hookswitch 13 to provide control signals to the muting switches 17 and 18, the DTMF generator 21, the memory unit 29, and the display unit 23 with visual display 24.

The display unit 23 is a well-known and commercially available array of light-emitting diodes (LED's) or the like for displaying the promotional message from the data memory (not shown) of the microprocessor 20. The microprocessor periodically update the characters of the display with the stored data representative of the promotional message from the data memory (not shown) of the microprocessor 20 during the silent interval between ringing signals, preferably between the first and second ringing signals, or during the silent interval after the SAS or CAS tone, in a manner similarly described in Doughty's U.S. Pat. No. 4,582,956, herein incorporated by reference in its entirety.

The memory unit 29 is a long term and erasable memory for storing the received promotional message along with the received date and time of the promotional message for later recall from the memory unit 29 and display in the visual display 24. The stored promotional message can include alphanumeric characters.

FIG. 4 shows a block diagram of a switching network comprising LSO 400 and OSO 401 which serve a plurality of telephone stations such as 402, 403 and 470 and a database 418.

By way of example, each of the telephone central offices is suitably a stored program-controlled switching system (SPCS) of the type disclosed in U.S. Pat. No. 4,551,581 issued to Carolyn A. Doughty on Nov. 5, 1985, in U.S. Pat. No. 4,567,323 issued to Lottes et al. on Jan. 28, 1986, in U.S. Pat. No. 3,570,008 issued to R. W. Downing et al. on Mar. 9, 1971, as well as in The Bell System Technical Journal, Volume 43, No. 5, Parts 1 and 2, September, 1964. These citations may be referred to for a more comprehensive understanding of the construction and operation of the switching system, but a brief description will be given herein to illustrate how the invention functions within a switching system.

LSO 400 comprises line link network 404, trunk link network 405, and a stored program-controlled processor 408. Line link network 404 provides the terminations for customer stations, such as 402 and 470, while trunk link network 405 provides the terminations for trunks such as interoffice trunk 432 which is terminated at LSO 400 via trunk circuit 431. The trunk link network also provides terminations for miscellaneous other circuits such as digit receiver 407, announcement system 421, etc. The line and trunk link networks are connected via wire junctors 406 to permit the interconnection of lines, trunks, and service circuits for call processing under the control of processor 408. Line link network 404 is also interconnected by junctor circuits such as 454 to complete and supervise intraoffice calls between stations such as 402 and 470.

The majority of the logic, control, storage, supervisory, and translation functions required for the operation of this system are performed by central processor 408. A typical central processor suitable for use in the illustrative switching system is described in "The Bell System Journal", Volume 56, No. 2, February 1977.

Processor 408 is a data processing facility and can be functionally divided into central control 409, call store 410, and program store 411 plus maintenance apparatus which has not been shown to simplify the drawing.

Call store 410 is a memory for storing translation and routing information in addition to temporary information relating to calls in progress and special services. This information includes the busy/idle status of circuits and telephone stations, calling/called telephone station directory numbers, special services information, etc.

In accordance with this invention, call store 410 also includes memory dedicated to the CID or CIDCW customer at telephone station 402 for storing on a per call basis information which is related to the calling party at telephone station 403. This information includes, in addition to the calling party's directory telephone number (DN) with or without a corresponding name, the "private" status of the DN which is "01" to indicate that the DN should not be disclosed to the CID or CIDCW customer at telephone station 402 and may also include date and time of day, messages, etc. The dedicated memory further includes a service indicator which is used to designate the stored information as that of the "calling" telephone station 403.

Program store 411 is a memory for storing the program instructions which direct the central control 409 to sequentially perform its many functions.

Central control 409 is the information processing unit of the system and executes the program instructions listed in program store 411 using information temporarily stored in call store 410.

Processor 408 interfaces with lines, trunks, and service circuits via scanners 412–414 and 453 and distributor 415. Distributor 415 responds to an order over a bus system from central control 409 to apply pulses to distribution points connected to peripheral units of equipment. For example, in response to an appropriate order, distributor 415 signals over conductor 416 to actuate data transmitter 450, apparatus such as a relay in trunk-circuit 431, digit receiver 407, announcement system 421, etc.

Scanners 412–414 and 453 are used to gather information for central control 409 by monitoring leads connected to the various peripheral units and telephone stations such as 402 and 470. Thus, when a trunk circuit such as 431 changes state as a result of a seizure from OSO 401, a signal is transmitted via conductor 417 to, scanner 413. Similarly, scanner 413 recognize changes of state in digit receiver 407 via conductor 419 in order to ascertain digits received from lines or trunks. Likewise, scanners 412 and 453 are used to recognize the busy/idle (off-hook/on-hook) condition of telephone stations 402 and 470. Periodically, the scanners are addressed by central control 409 over a bus system to determine the state of the peripheral units and telephone stations.

OSO 401 basically comprises the same units of equipment as LSO 400 and need not be described herein.

LSO 400 and OSO 401 are connected together and to other central offices (not shown) via a common channel interoffice signaling (CCIS) system comprising terminals 424 and 427, data units 425, and 426, and and data link 428. The signaling system provides high speed data transmission facilities between the central processors (408 and 429 respectively) of LSO 400 and OSO 401 to carry all signaling, address, and network control information independently of the interoffice 432 talking paths. For instance this information includes the identity of trunks used by thee telephone customers as well as calling/called party identification information. A typical example of a common channel interoffice signaling system which can be used in the present embodiment(s) of the invention is disclosed in "The Bell System Technical Journal", Volume 57, No. 2, February 1978.

To illustrated a first one of the embodiments of the present invention from a network perspective, let it be assumed that call store 410 of the LSO 400 has received and temporarily stored a marked or flagged "private" DN of a calling party from call store 422 of the OSO 401 during call setup. Central control 409 of the LSO, under the control of central processor 408 of the LSO, reacts to the "private" marked or flagged DN, as determined by information stored in a translation table (not shown) in the call store 410, by executing a call processing software program in program store 411 of the LSO associated with an on-hook procedure of the present invention and it causes CID customer telephone station 402 of the LSO to be connected through the line and trunk networks (404 and 405 respectively of the LSO) to ringing circuit 433 of the LSO which transmits intermittent ringing signals to the connected CID customer telephone station 402. Between each pair of ringing signals is a silent interval or, more particularly, a period of time in which a ringing signal is not present. During the silent interval, central control 409 of the LSO executes a program in program store 411 of the LSO which accesses database 418 of the LSO via data link 419 of the LSO and selects, sequentially, a promotional message from a plurality of promotional messages stored in the database 418 and signals distributor 415 of the LSO which, in turn, signals over conductor 416 of the LSO to actuate data transmitter 450 of the LSO. The data transmitter 450 reacts to the signaling from the distributor 415 by transmitting data representative of the promotional message selected from the database 418 to the CID customer CPE at telephone station 402 using FSK signaling. Following this LSO to CPE transmission of the promotional message, the next promotional message listed in the database 418 advances and waits for the next request. The reception, display and storage of the promotional message by the CID customer CPE at telephone station 402 is the same as previously described above.

To illustrate a second one of the embodiments of the present invention from a network perspective, let it be assumed that a CIDCW customer at telephone station 402 of the LSO 400 is conversing with a far-end caller at telephone station 470 of the LSO 400 via the LSO 400 and that a call waiting caller at telephone station 403 of the OSO 401 is attempting to reach the CIDCW customer. The process begins when call store 410 of the LSO 400 receives a marked or flagged "private" DN of the call waiting caller from call store 422 of the OSO 401 during call setup. The "private" marked or flagged DN indicates that the DN should not be disclosed to the CIDCW customer. Central control 409 of the LSO, under the control of central processor 408 of the LSO, reacts to the "private" marked or flagged DN, as determined by information stored in a translation table (not shown) in the call store 410, by executing a call processing software program in program store 411 of the LSO associated with a call waiting feature and it causes a predetermined alerting signal tone, i.e. a SAS tone or the SAS tone followed by a CAS tone, to be transmitted on the CIDCW customer loop via trunk link network 405 of the LSO and line link network 404 of the LSO. However, operations may require that a conventional call waiting (CW) tone be transmitted on the CIDCW customer loop instead of the SAS tone or the SAS tone followed by the CAS tone. In either case, central control 409, after the CIDCW customer CPE at telephone station 402 has muted its own handset for a predetermined interval of time corresponding to at least the duration of the promotional message to be transmitted between the LSO and the CPE in response to the alerting signal tone, executes a program in the program store 411 which accesses database 418 of the LSO via data link 419 of the LSO and selects, sequentially, by any known technique a promotional message from a plurality of promotional messages stored in the database 418 and signals distributor 415 of the LSO which, in turn, signals over conductor 416 of the LSO to actuate data transmitter 450 of the LSO. The data transmitter 450 reacts to the signaling from the distributor 415 by transmitting data representative of the promotional message selected from the database 418 to the CIDCW customer CPE at telephone station 402 using FSK signaling during a silent interval after the alerting signal tone. As previously stated above, following this LSO to CPE transmission of the promotional message, the next promotional message listed in the database 418 advances and waits for the next request. The reception, display and storage of the promotional message by the CIDCW customer CPE at telephone station 402 is the same as previously described above.

It is to be understood that proper operation may also require that an acknowledge signal be transmitted from the CIDCW customer CPE at telephone station 402 to the LSO in response to the alerting signal tone. In this case, the LSO to CPE transmission of the promotional message occurs only if the acknowledge signal is received at the LSO during the silent interval after the alerting signal tone. It is also to be understood that proper operation may require that the CIDCW customer CPE be capable of detecting and responding to the CAS tone, which is not audible to the human ear, or to the SAS or CW tone.

The embodiments illustrated and discussed herein are intended only to teach those skilled in the art the best way known by the inventor to make and use the invention. Nothing in the specification should be considered as limiting the scope of the present invention, but rather as an exemplification of the preferred embodiments thereof. Many other variations are possible. Any changes could be made by those skilled in the art to produce equivalent methods and systems without departing from the invention. The scope of the invention should be determined not by the embodiment(s) illustrated, but by the appended claims and their legal equivalents.

What is claimed is:

1. A method of providing to a customer already engaged in a conversation with a far-end caller via a local switching office (LSO) an advertising message from said LSO, comprising the steps of:

(a) said LSO, after receiving a private marked directory telephone number (DN) of a call-waiting caller from an originating switching office of the call waiting caller indicating that said DN is not to be disclosed to the customer, sending an alerting tone signal to the customer;

(b) the customer apparatus responding to the alerting tone signal from said LSO by muting its associated handset for a predetermined interval of time;

(c) said LSO selecting the advertising message from a plurality of advertising messages stored in an associate database and then transmitting said selected advertising message from the associate date to the customer apparatus during the predetermined interval of time;

(d) said apparatus of the customer receiving said advertising message from said LSO during the predetermined interval of time and display said received advertising message to the customer; and (e) said apparatus of the customer subsequently storing said received advertising message in an associate memory for later retrieval and review.

2. A telephone switching system, comprising:

(a) means for sending an alerting tone signal to a customer already engaged in a conversation with a far-end caller to indicate an incoming call from a call waiting (CW) caller, after receiving said CW caller's telephone number with or without a corresponding name (DN) marked as private indicating that said DN is not to be disclosed to the customer; and (b) means for selecting an advertising message from a plurality of advertising messages stored in an associate database and then transmitting said selected advertising message from the associate database to the customer apparatus during a silent interval after the alerting tone signal while the customer is engaged in the conversation with the far-end caller, after the customer apparatus has muted its associate handset for a predetermined duration of time and transmitted an acknowledge signal to said switching system in response to the alerting tone signal, said apparatus receiving and displaying to the customer during the silent interval while the customer is engaged in the conversation with the far-end caller said selected advertising message from the associate database and subsequently storing said received advertising message in an associate memory for later retrieval and display.

3. A method of providing to a customer at a selected called station a promotional message (PM) from a local switching office (LSO), comprising the steps of:

(a) said LSO, after receiving an incoming caller's directory telephone number (DN) marked as private from an originating switching office of the incoming caller indicating that said DN is not to be disclosed to the customer at the selected called station, sending intermittent ringing signals to the customer;

(b) said LSO selecting said PM from a plurality of promotional messages stored in an associate database and then transmitting said selected PM from the associate database to the customer's premises equipment (CPE) during a silent interval after a first one of said ringing signals;

(c) said CPE of the customer receiving said PM from said LSO during the silent interval after the first one of said ringing signals and displaying said received PM to the customer; and (d) said CPE of the customer subsequently storing said received PM in an associate memory for later recall and display.

4. A method as set forth in claim 1, wherein step (b) comprises the step of transmitting an acknowledge signal to said LSO after the customer apparatus mutes its associated handset for the predetermined interval of time.

5. A method as set forth in claim 4, wherein step (c) comprises the alternate step of selecting an advertising message from a plurality of advertising messages stored in an associate database and then transmitting said selected advertising message from the associate database to the customer apparatus during the predetermined interval of time in response to receiving the acknowledge signal from the customer apparatus.

6. A method as set forth in claim 1, wherein the customer apparatus is a cellular mobile phone.

7. A method as set forth in claim 3, wherein ad CPE of the customer is a cellular mobile phone.

* * * * *